United States Patent [19]
Nakamura

[11] Patent Number: 6,087,735
[45] Date of Patent: *Jul. 11, 2000

[54] POWER CIRCUIT FOR MARINE ENGINE

[75] Inventor: Kazuhiro Nakamura, Hamamatsu, Japan

[73] Assignee: Sanshin Kogyo Kabushiki Kaisha, Shizuoka-ken, Japan

[*] Notice: This patent is subject to a terminal disclaimer.

[21] Appl. No.: 09/119,725

[22] Filed: Jul. 23, 1998

[30] Foreign Application Priority Data

Jul. 23, 1997 [JP] Japan ..................................... 9-196839

[51] Int. Cl.$^7$ ............................... B60L 1/00; F02N 17/00
[52] U.S. Cl. ......................... 307/9.1; 123/179.1; 361/253
[58] Field of Search ..................................... 307/9.1, 10.1, 307/10.3, 10.6; 361/247, 253; 123/179.1, 179.5

[56] References Cited

U.S. PATENT DOCUMENTS

| | | |
|---|---|---|
| 5,109,191 | 4/1992 | Nakamura . |
| 5,111,132 | 5/1992 | Motose . |
| 5,182,510 | 1/1993 | Nakamura . |
| 5,233,282 | 8/1993 | Iwahita . |
| 5,685,802 | 11/1997 | Kanno . |
| 5,706,783 | 1/1998 | Sawada . |
| 5,866,418 | 3/1999 | Kondo et al. ............................. 307/9.1 |

*Primary Examiner*—Jeffrey Gaffin
*Assistant Examiner*—Rios Roberto
*Attorney, Agent, or Firm*—Knobbe, Martens, Olson & Bear LLP

[57] ABSTRACT

One embodiment of an engine has an electrical system generally comprising a charge circuit and an ignition circuit. A primary power supply circuit connects the charge circuit and the ignition circuit through a non-contact switch circuit. The non-contact switch is adapted to connect the primary power supply circuit to the ignition circuit when the engine is started. A secondary power supply circuit is coupled to at least one electrical component and to the ignition circuit. The secondary power supply circuit has a main switch and a fuse arranged upstream of the main switch. Upon closing the main switch, the engine is started and the primary power supply circuit and the associated non-contact switch are closed. Another embodiment of the engine has an electrical system which adds control of a fuel injector circuit. The fuel injector circuit is in electrical communication with the ignition circuit and a switching circuit which controls the ignition circuit and the fuel injector circuit.

19 Claims, 13 Drawing Sheets

POWER CIRCUIT FOR MARINE ENGINE

FIELD OF THE INVENTION

The present invention generally relates to an electrical system for use with motors. In particular, the present invention relates to a power circuit adapted to power both auxiliary electrical equipment and ignition circuitry for an engine used in marine applications.

BACKGROUND OF THE INVENTION

Watercraft are commonly powered by inboard or outboard motors. The motor includes a water propulsion device which is powered by an internal combustion engine. The motor also typically contains, at least in part, an electrical system. As is well known, an ignition system, which forms a part of the electrical system, fires one or more ignition elements, or spark plugs, which correspond to the combustion chambers of the engine, thereby igniting the air and fuel mixture in each combustion chamber. The watercraft also typically includes several lights and gauges commonly powered by the electrical system.

With reference to FIG. 1, a standard electrical system commonly utilized in watercraft is illustrated. As shown, the circuitry consists of a hull-based circuitry portion A' and a motor-based circuitry portion B'. The motor-based circuitry portion B' in the illustrated embodiment includes a generator circuit 257 and an ignition circuit 248. The generator circuit 257 generally comprises a charging coil 254 and a rectifier 256. The ignition circuit 248 includes a plurality of spark plugs 244a–d, and at least two pulsar coils 270, 272. The hull-based circuitry portion A' in the illustrated example includes a battery 252, a main switch 238 and a kill switch 239. The hull-based circuitry portion A' also includes a plurality of electrical equipment 234, such as switches, gauges and other indicators which are powered by the electrical system.

In the embodiment of FIG. 1, the hull-based circuitry portion A' and the motor-based circuitry portion B' are connected together in a known manner, such as, for instance, by using common quick-connect connectors 250. Moreover, because a current potential of the battery 252 is very high, a main fuse 262 is provided between the two portions A', B' for protecting both the ignition circuit and the electric equipment 234.

A feeder circuit 259 is connected to the charging circuit 257 for feeding both the ignition circuit 248 and the electric equipment 234. This feeder circuit 259 enters the hull side of the watercraft through a connector 250 and is connected to the electric equipment 234 in the hull through the main switch 238. The feeder circuit 259 is also connected to the ignition circuit 248 through a connector 250 in the outboard motor side. Desirably, an additional accessory fuse 264, having a lower current rating than the main fuse 262, is provided for protecting the electric equipment 234.

While this electrical system allows the same circuit to power both the ignition circuit 248 and the electrical equipment 234, the current tolerance for the ignition circuit 248 is typically higher than that of the electric equipment 234. Accordingly, the current rating for the accessory fuse 264 is calculated to protect the electric equipment 234 while disregarding the ignition circuit requirements. This arrangement is disadvantageous because the electric equipment then sets the level of current which may be passed on to the ignition circuit at a level substantially below the current tolerance of the ignition circuit.

Moreover, with a conventional engine having a DC-CDI (i.e., direct current—capacitor-discharge ignition) type of ignition circuit, an engine-hunting (or adjustment) results from an unstable charge level in the ignition circuit because of hull vibrations. Specifically, the hull vibrations may cause the main switch to chatter and disrupt the electrical circuitry. Also, corrosion or rust may affect the connectors, thereby reducing the reliability of the electrical system feeder which does not have a redundancy built in.

An improved power circuit which overcomes the above-stated problems is therefore desired.

SUMMARY OF THE INVENTION

Accordingly, one aspect of the present invention involves an electrical system for an engine. The electrical system comprises a charge circuit and an ignition circuit. A primary power supply circuit directly connects the charge circuit and the ignition circuit through a non-contact switch. An auxiliary power supply circuit also electrically couples the charge circuit to both an electrical equipment element and the ignition circuit. Initially, power is supplied through the auxiliary power supply circuit to start the engine. The non-contact switch is adapted to connect the primary power supply circuit to the ignition circuit following starting of the engine.

Another aspect of the present invention involves an electrical system for an engine which comprises a power source, a direct power supply circuit and a fused power supply circuit. The power source is designed to emit a substantially constant voltage. The direct power supply circuit directly connects the power source and an ignition system through a non-mechanical switch. Moreover, the fused power supply circuit electrically couples the power source through a fuse to at least one electrical component and to the ignition system. The fused power supply circuit initially provides the electrical power to the engine for starting while a means for detecting an engine start activates the non-mechanical switch upon an engine start. The non-mechanical switch, when closed, allows the direct power supply source to provide the electrical power to the ignition circuit and the engine.

Further objects, features, and advantages of the present invention over the prior art will become apparent from the detailed description of the drawings which follows, when considered with the attached figures.

DETAILED DESCRIPTION OF THE PREFERRED EMBODIMENTS OF THE INVENTION

The present invention is related to a power circuit for an engine. Preferably, the present electrical system is associated with an engine used in a marine application, such as for powering an outboard motor. While the illustrated embodiments are described with reference to an environment of outboard motors for watercraft, those of skill in the art will readily appreciate that the electrical system of the present invention can also be used with engines adapted for use in a plethora of other applications.

Figure 1:
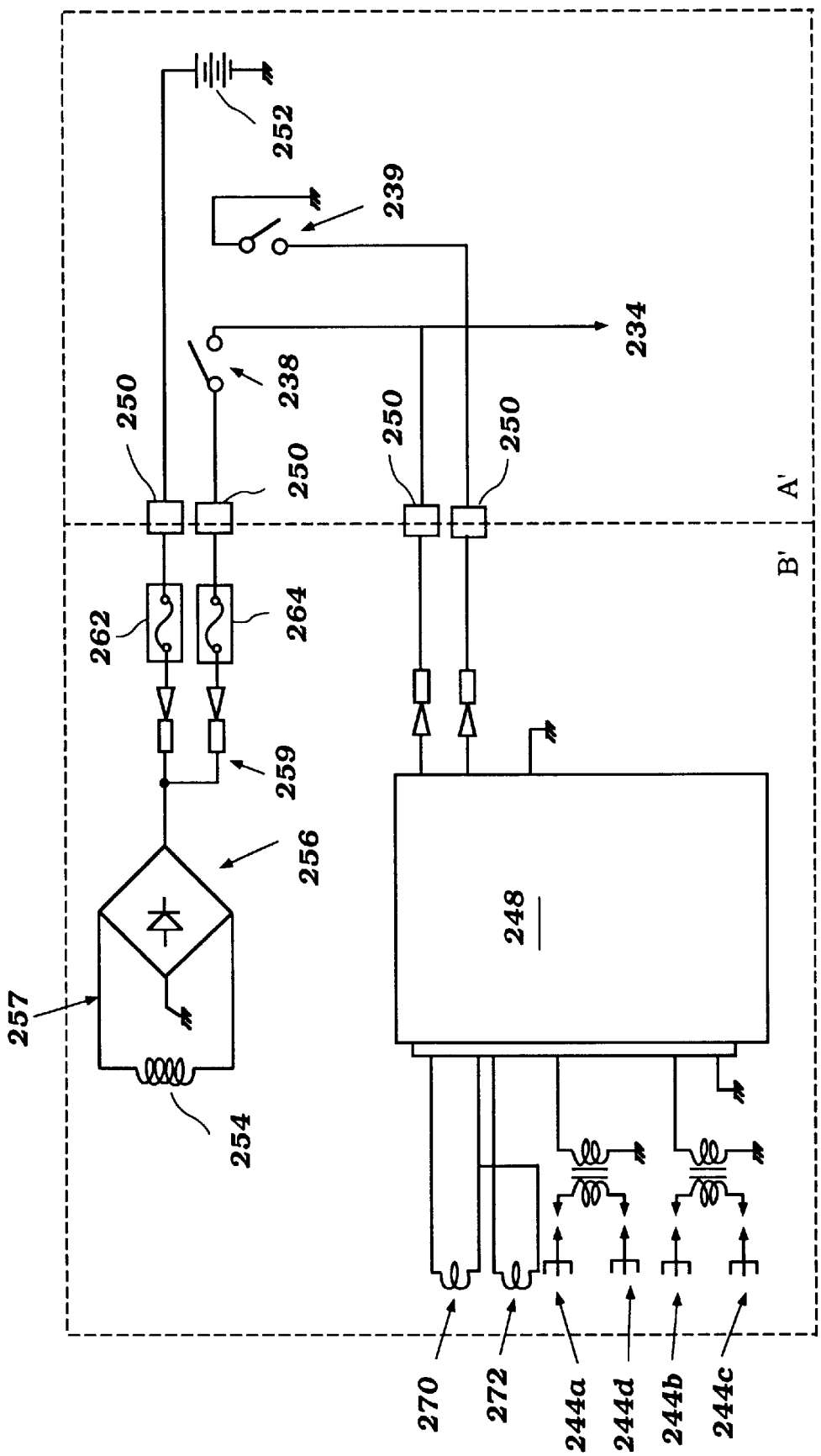
FIG. 1 is a diagram of a electrical system for an engine in accordance with the conventional engines.
Figure 2:
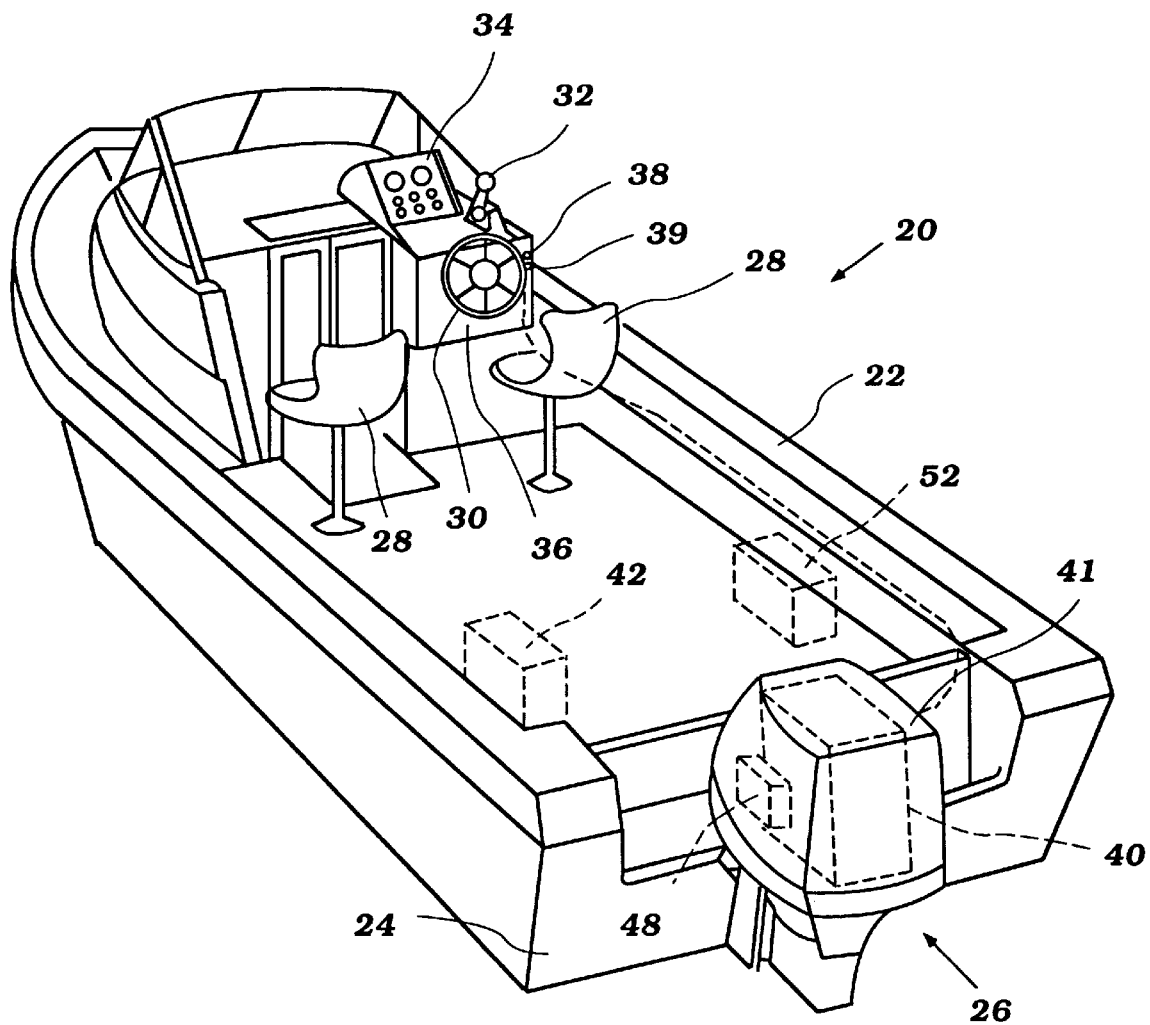
FIG. 2 is a perspective view of a watercraft having an outboard motor.

Referring to FIG. 2, an exemplary watercraft 20 is illustrated. The exemplary watercraft 20 is a power boat, but may comprise any number of other types of crafts. The illustrated watercraft 20 has a hull 22 with a transom portion 24 to which is mounted an outboard motor 26. The outboard motor 26 is utilized to propel the watercraft 20. As known to those of skill in the art, the motor 26 may also be of the inboard type, utilizing a stern drive, for example. When of the outboard variety, the motor 26 is connected to the watercraft 20 in a manner which allows it to pivot up and down in a vertical plane ("trimming") and rotate left and right in a horizontal plane ("steering") in a manner well known to those skilled in the art.

The illustrated watercraft 20 also includes a pair of seats 28. One of the seats 28 is preferably positioned near a steering wheel 30. The steering wheel 30 is remotely connected to the outboard motor 26 for effectuating left and right steering movement of the motor. Additionally, a throttle control, such as a handle 32, is preferably positioned near the steering wheel 30 for use in controlling the speed of the watercraft 20 by changing the speed of the engine powering the motor 26. Preferably, this handle 32 simultaneously serves as a shift control lever for controlling the position of a transmission (not shown) associated with the motor 26. Such transmissions are well known, and generally permit the an operator to engage the motor 26 in forward and reverse states, as well as allowing the operator to disengage the motor from a driving position, as in a neutral state.

A control panel 34 is preferably provided near the steering wheel 30. The control panel 34 has one or more gauges, meters, lights or other indicators for displaying various information to an operator of the watercraft 20. These indicators may display watercraft speed and the like. A switch panel 36 is also provided near the steering wheel 30. The switch panel 36 preferably includes one or more switches or controls, such as a main switch 38 and a kill switch 39. The main switch 38 is commonly utilized to turn on and off the motor under standard operating conditions. The kill switch 39 provides a means for shutting down the motor.

Referring still to FIG. 2, the motor 26 has a water propulsion device, such as a propeller (not shown) which is powered by an engine 40. The majority of the details of the engine 40 are not described herein and are well known to those of skill in the art.

The engine 40 can be arranged in a variety of configurations, such as in-line, "V" or opposed, can operate on a two or four-cycle principle, and can be of the rotary, reciprocating piston or other type. The illustrated engine 40 has four cylinders (and thus four combustion chambers) each having a piston reciprocally mounted therein and attached to a crankshaft. The illustrated engine 40 also operates on a four cycle principle.

The engine 40 is preferably mounted within a cowling 41 of the motor 26. In the illustrated embodiment, the engine 40 is oriented within the cowling such that the crankshaft is substantially vertically extending and is in driving relation with the water propulsion device (not shown) of the motor 26. In general, the engine 40 includes a fuel supply system for supplying fuel from a fuel source, such as a fuel tank 42, to each combustion chamber of the engine 40. Moreover, the fuel supply for the engine can be either fuel-injected or carbureted. In the illustrated embodiment of FIG. 13, the engine is fuel-injected. The engine 40 also includes an induction system for supplying air to each combustion chamber. An exhaust system routes exhaust gases resulting from combustion away from the engine 40 to a point external to the motor 26.

Figure 3:
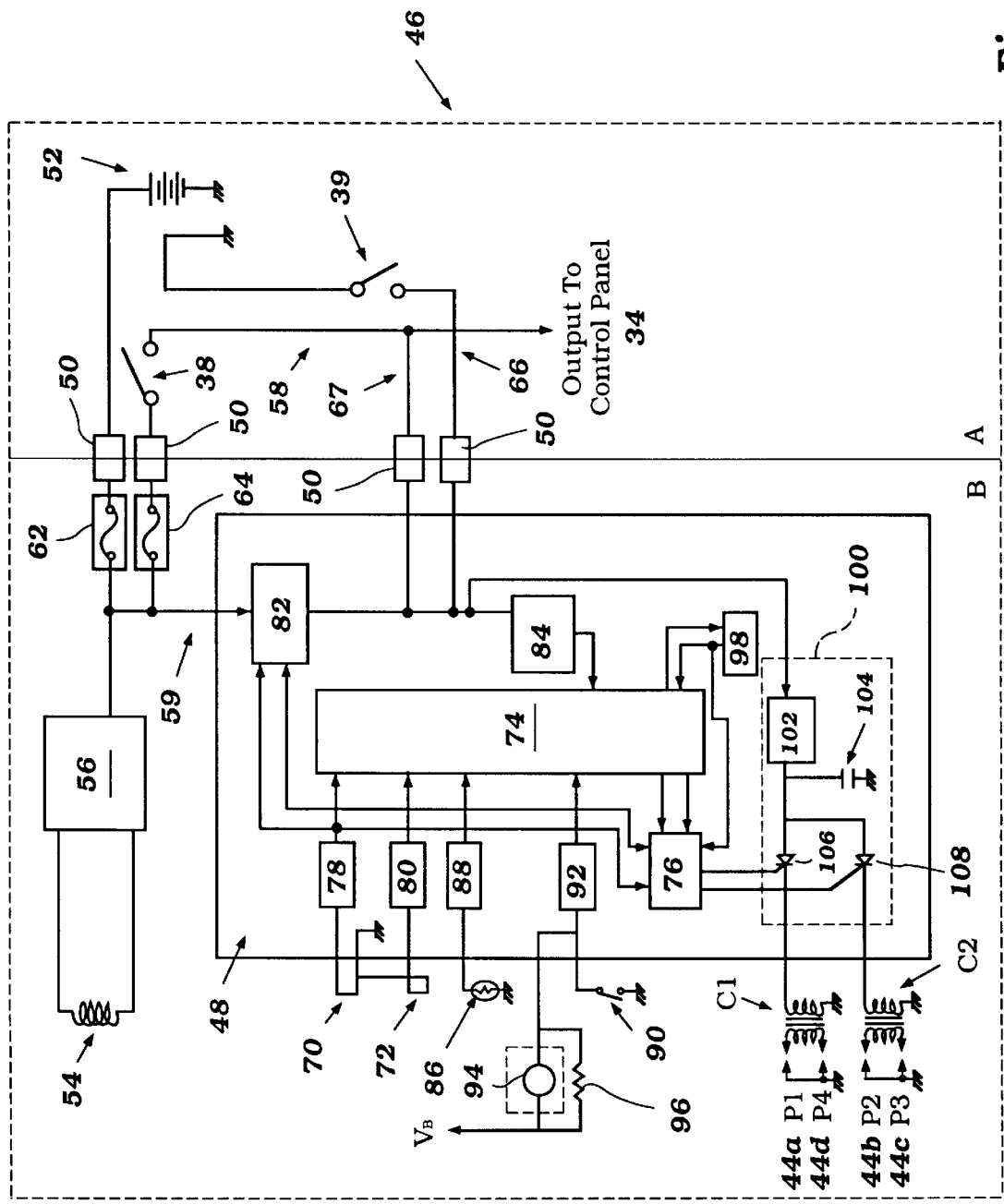
FIG. 3 is a circuit diagram of an embodiment of an electrical system for use in connection with the outboard motor illustrated in FIG. 2, the electrical system including a power circuit having aspects, features and advantages in accordance with the present invention.

An electrical system 46, illustrated in FIG. 3, is also associated with the watercraft 20. The electrical system 46 has components mounted both on the motor 26 and within the hull 22 of the watercraft 20. Because the motor 26 is detachable from the hull of the watercraft 20, various electrical connectors 50 are included in the electrical system 46. These connectors 50 permit separation and reconnection of those components into two portions of the electrical system 46. With reference to FIG. 3, a first area A denotes those components of the illustrated electrical system 46 which are positioned in the hull 22 of the watercraft 20, while a second area B denotes those components of the illustrated electrical system 46 which are associated with the motor 26.

With continued reference to FIG. 3, the illustrated electrical system 46 includes an ignition system for initiating combustion of the air and fuel mixture supplied to each combustion chamber. This ignition system includes an ignition element associated with each cylinder of the engine. The ignition elements comprise at least one spark plug 44a–d associated with each cylinder of the engine (spark plug 44a corresponding to a first cylinder, spark plug 44b corresponding to a second cylinder, spark plug 44c corresponding to a third cylinder, and spark plug 44d corresponding to a fourth cylinder). A firing mechanism is associated with the spark plugs 44a–d for inducing a spark across a gap of each spark plug 44a–d in order to initiate ignition of the fuel and air mixture within a combustion chamber or cylinder. In addition, the ignition system includes an ignition control circuit 48, described in detail below, which is provided for controlling the firing mechanism.

The illustrated electrical system 46 also has a base or primary power supply. This base power supply preferably comprises a battery 52 or other energy storage cell. As illustrated in FIG. 2, the battery 52 may be conveniently mounted in the watercraft 20. In addition, the electrical system 46 includes a secondary power supply. As illustrated in FIG. 3, this power supply comprises a charging coil 54 associated with the engine 40. For example, the coil 54 may be associated with a flywheel mounted on an output or crankshaft (not shown) of the engine 40, or be a separate generator, as is known to those of skill in the art. This coil 54 provides an electrical output when the engine 40 is running. The output passes through a rectifier 56. Either the battery 52 or charging coil 54 provides power through a power circuit to the ignition control circuit 48.

As also illustrated in FIG. 3, power is provided through the auxiliary watercraft power circuit 58 and primary watercraft power circui 59 when the main switch 38 is closed. During engine start-up, and before the charging coil 54 provides power, when the main switch 38 is closed, power is provided by the battery 52 through the auxiliary power circuit 58 and a back-up circuit 67. When the coil 54 is charging, power is provided through the primary power circuit 59 to the ignition control circuit 48. A main fuse 62 is provided along a circuit connecting the rectified charging coil 54 output and the battery 52 for preventing excessive current from flowing therethrough. Likewise, a similar fuse 64 is provided along the auxiliary watercraft power circuit 58. In general, a circuit extending between two components without a fuse interposed between the two components will be called a direct circuit and a circuit extending between two components with a fuse interposed between the two components will be called a fused circuit. Thus, as used herein, a circuit extending between a power source and another electrical component and having a fuse interposed between the two will be referred to as a fused power supply while such a circuit having no fuse interposed between the two will be referred to as a direct power supply. For instance, the primary power circuit 59 that passes from the generator coil 54, or the auxiliary power source, to the ignition control circuit 48 through the non-contact switch 82 would be considered an example of a direct power supply while the auxiliary power circuit 58 that passes from the battery 52, or the primary power source, through a fuse (i.e., 62 or 64) to the ignition control circuit 48 would be considered an example of a fused power supply.

As described above, when the main switch 38 is initially closed, power flows through the auxiliary watercraft power circuit 58, through a back-up circuit 67 and into a CPU 74. An engine starter motor (not shown) is then engaged to start the engine in a known manner. An engine start is detected in the illustrated embodiment by pulsar coils 70, 72 which communicate with an input circuit 78. Specifically, the pulsar coils 70, 72 send a signal through the input circuit 78 to a non-contact switch circuit 82. The signal closes the switch circuit 82 and allows power to flow through the primary watercraft power circuit 59. The non-contact switch circuit 82 can be any non-mechanical switch, such as, for instance, a FET or other type of transformer-based switch, or the like.

Upon activating the non-contact switch circuit 82, power is provided to the ignition control circuit 48 through the primary watercraft power circuit 59 while power is provided to the hull-based electrical equipment, such as the control panel 34 through the auxiliary watercraft power circuit 58. Accordingly, the power to the ignition control circuit 48 and associated ignition system does not pass through the auxiliary fuse 64. To shut down the engine, the main switch 38 must be opened and the kill switch 39 must be closed. The kill switch 39 is associated with a kill circuit 66. This circuit 66 connects to the ignition control circuit 48 and grounds the system in a known manner (stopping the firing of the spark plugs 44*a–d* and thus stopping the engine 40) when the switch 39 is closed.

Figure 4:
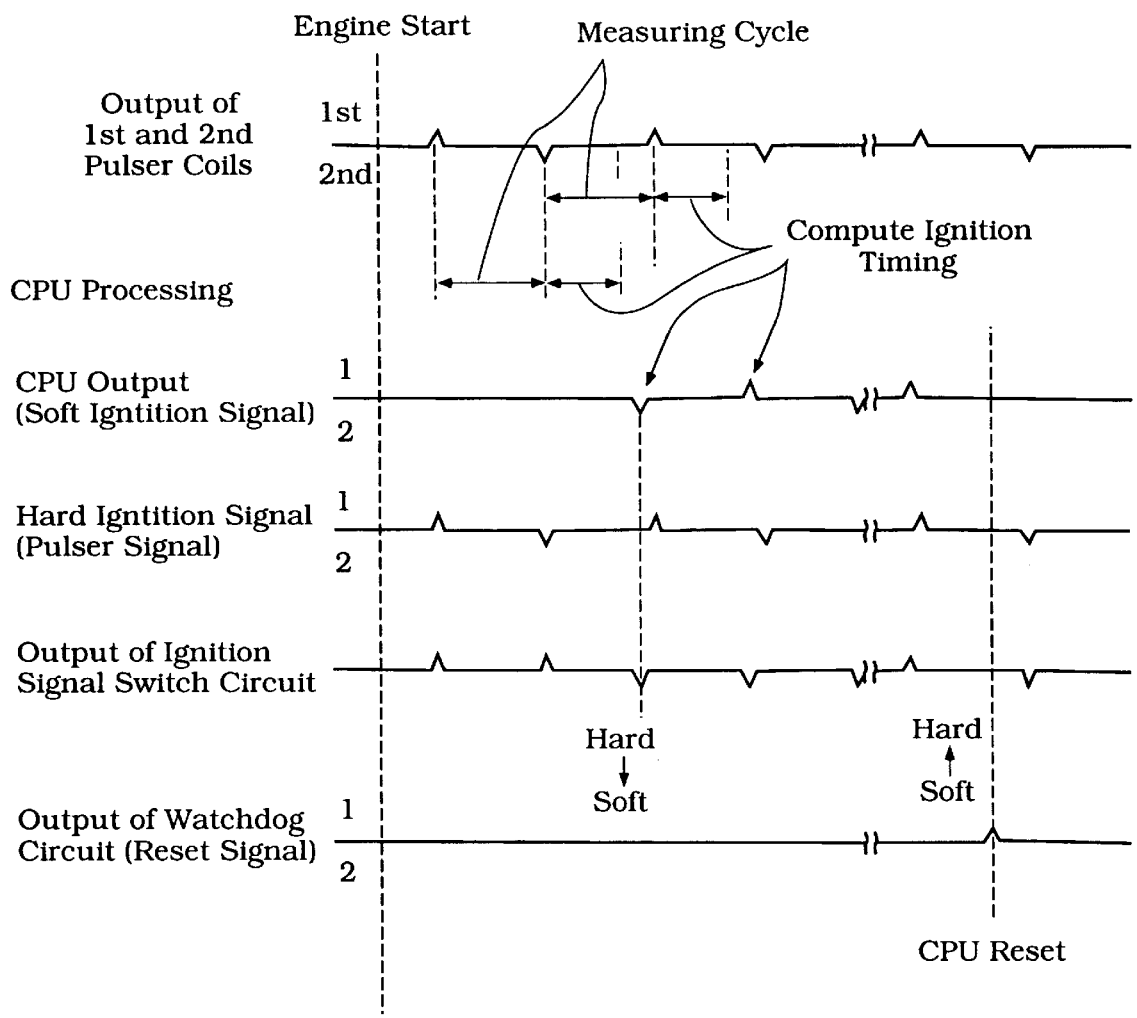
FIG. 4 is a graph illustrating an exemplary output of a CPU, switch circuit, watchdog circuit and pulser coils of the electrical system of FIG. 3.

As introduced above, first and second pulser coils 70,72 are used to generate and output an ignition timing signal, as illustrated at the top of FIG. 4. In general, each pulser coil 70,72 provides an output signal or spike at a specific time, such as when a member mounted on a flywheel of the engine 40 passes by a pick-up element. In the illustrated arrangement, the first pulser coil 70 provides an ignition timing signal corresponding to the spark plugs 44*a*,44*d* corresponding to the first and fourth cylinders, while the second pulser coil 72 provides such a signal corresponding to the spark plugs 44*b*,44*c* corresponding to the second and third cylinders. The output of the pulser coils 70,72 is provided to a computer processing unit (CPU) 74 and an ignition switching circuit 76 of the ignition control circuit 48 through a respective input circuit 78,80. Power is provided to the CPU 74 through a non-contact type switch 82 through an input circuit 84.

A thermosensor 86 senses engine temperature. The thermosensor 86 may be arranged to monitor the engine temperature by measuring the temperature of a coolant jacket associated with a cooling system of the engine 40. The temperature of the coolant flowing through the coolant jacket can also be monitored by the sensor 86. The output of the sensor 86 passes through an input circuit 88 to the CPU 74. As described in more detail below, the CPU 74 utilizes the output of this sensor 86 in an engine overheat detection system.

An oil pressure switch 90 is also provided. When this switch 90 closes, a signal is sent to the CPU 74 through an input circuit 92. At the same time, an alarm or lamp 94 is activated. A load or resistance 96 is associated with the alarm or lamp circuit, as is well known. The alarm or lamp 94 is preferably mounted at or near the control panel 34 of the watercraft 20.

The ignition control circuit 48 includes a watchdog circuit 98. This circuit 98 monitors the condition of the CPU 74. As described in more detail below in conjunction with FIG. 4, the watchdog circuit 98 is arranged to reset the CPU 74 and the switching circuit 76 with an appropriate output signal.

The ignition control circuit 48 also includes a capacitor-discharge ignition (CDI) circuit 100. This circuit 100 includes a control 102 which is powered and which is arranged to control the charging of a charging condenser 104. The charge condenser 104 is capable of raising the voltage in the ignation circuit above the level of the secondary power supply (i.e., the charging circuit) or the charging coil 54.

The spark plugs 44*a*,44*d* corresponding to the first and fourth cylinders are associated with a first ignition coil C1. The spark plugs 44*b*,44*c* corresponding to the second and third cylinders are associated with a second ignition coil C2.

The first ignition coil C1 is linked through a first circuit to the charging condenser 104, and the second ignition coil C2 is lined through a similar second circuit. The CDI circuit 100 includes a first thyristor 106 positioned along the first circuit, and a second thyristor 108 is positioned along the second circuit. Both thyristors 106,108 are controlled by an output signal from the switching circuit 76. When the switching circuit 76 sends an appropriate signal to either of the thyristors 106,108, they open and current is allowed to flow from the condenser 104 through the first or second circuit to the first or second ignition coil C1,C2, at which time a spark is induced at the spark plugs corresponding thereto.

Those of skill in the art will appreciate that in the four-cycle engine, each cycle comprises seven-hundred and twenty degrees of crankshaft rotation. In one three-hundred and sixty-degree rotation, each piston moves from top dead center downwardly to bottom dead center in an induction mode, then moves back to top dead center for combustion. In the next three-hundred and sixty degree cycle the piston moves downwardly as driven by the expanding combustion gasses, and then moves upwardly back to top dead center in an exhaust sequence.

In the engine arranged as described above, the pistons corresponding to a pair of cylinders (such as the first and fourth cylinders) are generally in the same position, but three-hundred and sixty degrees apart in the operating cycle. In other words, when the piston corresponding to the first cylinder is at top dead center for combustion, the piston corresponding to the fourth cylinder is also at top dead center but in the exhaust sequence. Likewise, the second and third cylinders are so interrelated.

In the illustrated embodiment, the spark plugs 44a,44d corresponding to the first and fourth cylinders are fired at the same time. As described in more detail below, the firing of the spark plug corresponding to cylinder which is in the combustion portion of the cycle is effective in initiating combustion, while the simultaneous firing of the spark plug corresponding to the other cylinder is ineffective since it is in exhaust mode. Thus, in each firing of both pairs of spark plugs 44a/44d and 44b[<m]ed/44c only one of the firings is "effective" or "actual" in the sense that it initiates combustion.

A first aspect of the illustrated ignition control will be described with reference to FIG. 4. Once the engine 40 is started, the pulser coils 70,72 provide output signals and the CPU 74 begins processing the signals. In one embodiment, the CPU 74 does not begin to provide an ignition timing output signal for some time after the engine 40 has been started. In the illustrated embodiment, this time constitutes two measuring cycles. These measuring cycles comprise a time between pulses or output spikes from the first and second pulser coils 70 and 72. Thereafter, the CPU 74 provides a second or "soft" ignition timing signal which is based on, but may vary from, the first signal from the pulser coils 70,72. The CPU 74 may alter the first signal based on a variety of factors to optimize ignition firing timing.

During the time before the CPU 74 provides an ignition timing output signal, the spark plugs 44a–d are fired based on the output of the pulser coils 70,72. In particular, the output of the pulser coils 70,72 is provided to the switching circuit 76, which uses the signals directly as the ignition signals for the thyristors 106,108. After the CPU 74 begins providing an ignition firing signal, the switching circuit 76 is arranged to move to a "soft" mode in which it utilizes the ignition timing signal from the CPU 74 as the ignition firing timing signal (i.e. the signals from the pulser coils 70,72 are used unless the CPU 74 is providing a signal). This arrangement is advantageous since it provides time for the CPU 74 to calculate an accurate firing timing signal considering actual engine conditions.

As also illustrated in this figure, in the event of engine shut-down, or lack of power, or the like, the watchdog circuit 98 is arranged to reset the CPU 74. Until the time for the CPU 74 to provide ignition timing signals has elapsed, the switching circuit 76 is arranged to utilize the hard ignition timing signals from the pulser coils 70,72, as described above.

Figure 5:
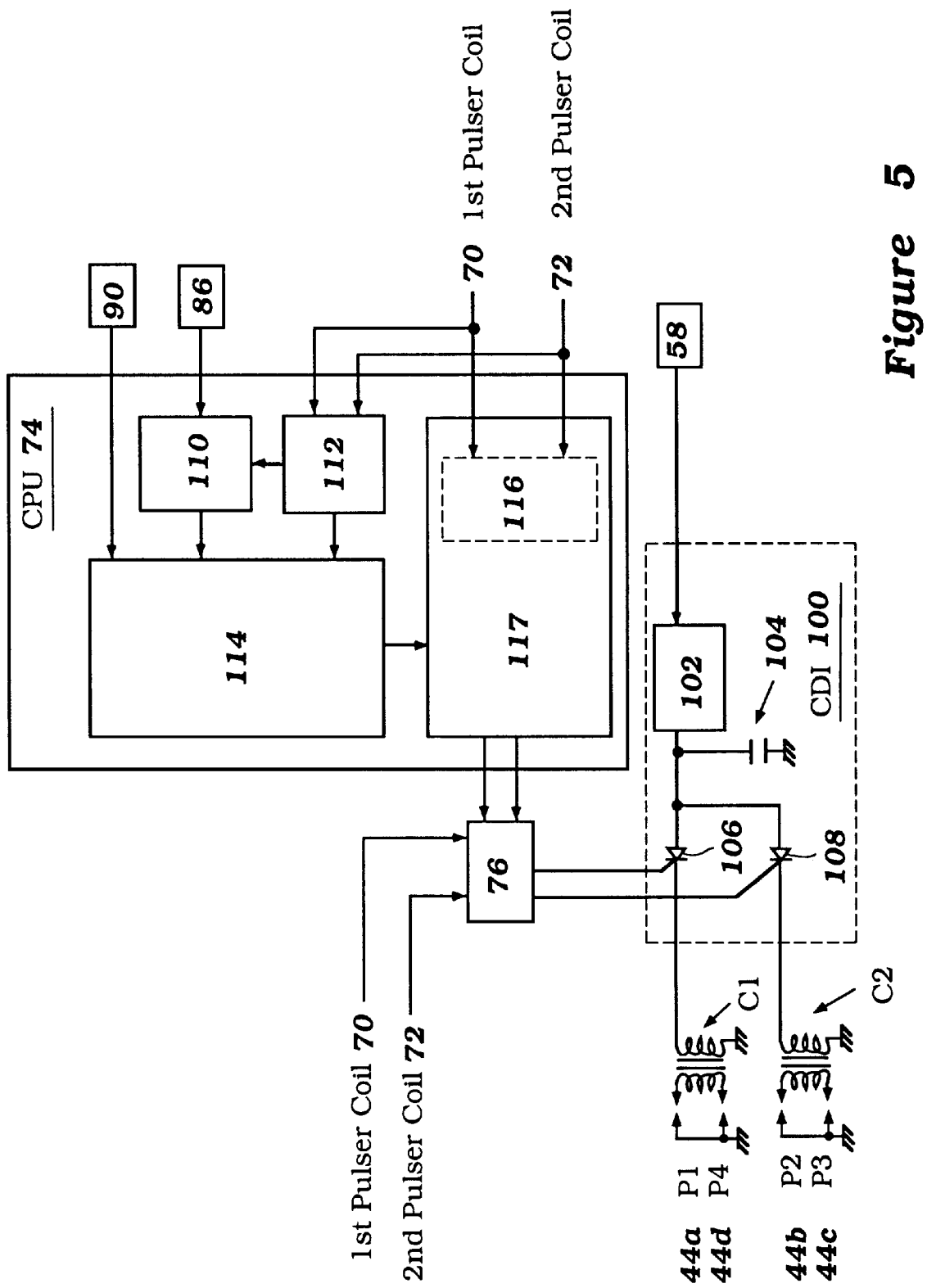
FIG. 5 is a circuit diagram illustrating in greater detail an ignition control circuit of the electrical system of FIG. 3.

Additional aspects of the ignition control will be described with reference to FIG. 5. As illustrated, the CPU 74 preferably includes an overheat detection portion 110, an engine speed computation portion 112, a disabling cylinder determining portion 114, and an ignition signal output portion 117 which includes an ignition order counter portion 116.

The output of the thermosensor 86 is provided to the overheat detection portion 110. In the event an engine overheat situation is detected, an engine overheat protection function is employed by the CPU 74, as described in more detail below in conjunction with FIGS. 10–13.

The output of the pulser coils 70,72 is provided to the engine speed computation portion 112, which determines the engine speed from the output of the pulser coils 70,72. As described in more detail below, the CPU 74 employs an engine speed reduction or overrev prevention function in the event the engine speed exceeds a predetermined speed.

The output of the pulser coils 70,72 is also provided to the ignition order counter portion 116 of the CPU 74. This portion of the CPU 74 is arranged to utilize the pulser coil 70,72 signal output to count and assign a count value to these signals as illustrated in FIG. 6.

Figure 6:
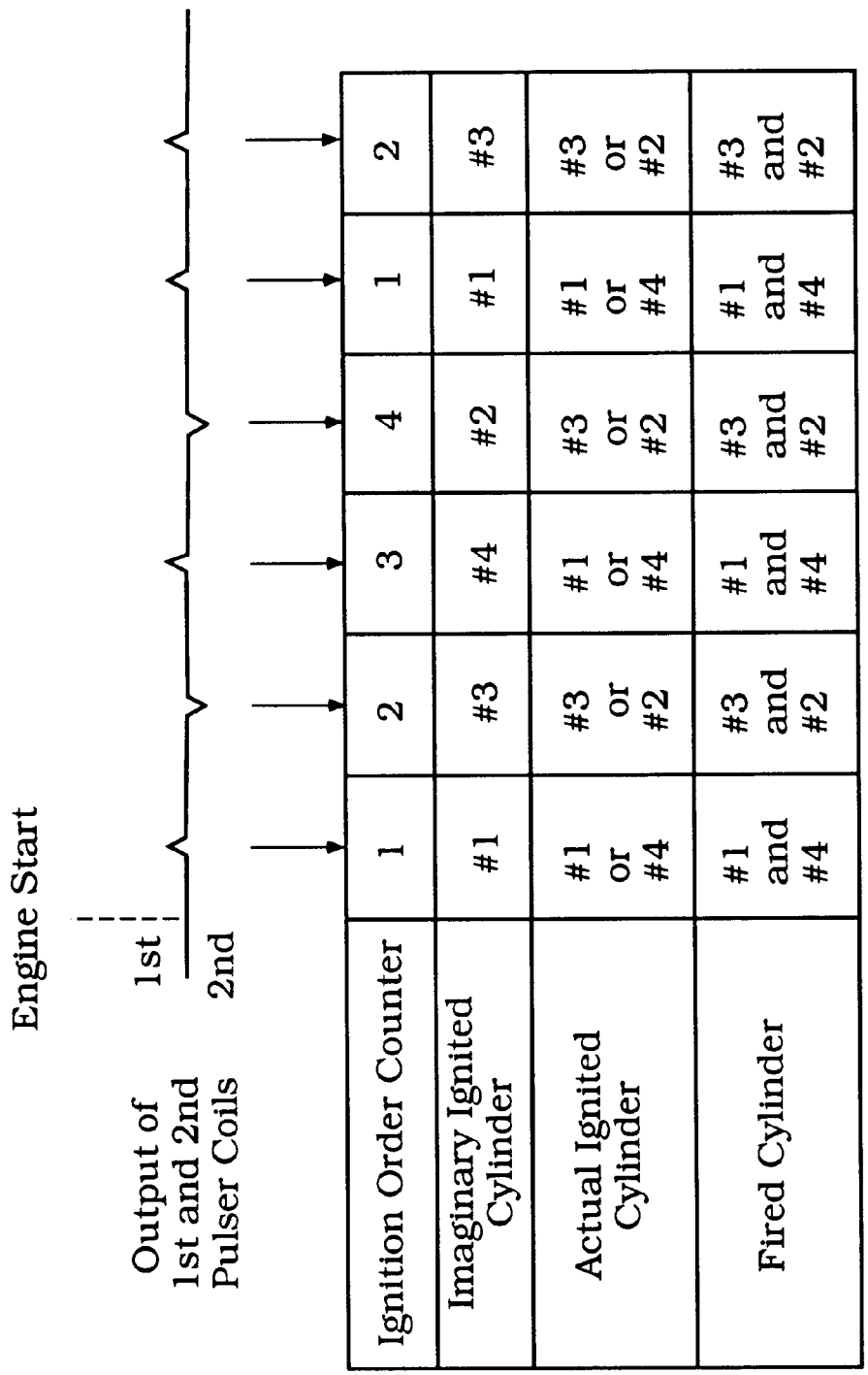
FIG. 6 is an exemplary table illustrating ignition order counter data, imaginary ignited cylinder data, actual ignited cylinder data and fired cylinder data of the ignition control circuit illustrated in FIG. 5 as compared to pulser coil output.

FIG. 6 is a table which correlates the pulser coil 70,72 outputs to a variety of cylinder firing data. When the first pulser coil 70 provides a first signal, the ignition order counter portion 116 gives the signal a value of 1. In the arrangement where the firing order for the cylinders is arranged to be 1, 3, 4, 2, the first signal is assumed to correspond to cylinder 1. In other words, an imaginary ignited cylinder value of 1 is assigned, because it is assumed the first cylinder fired. Because the first pulser coil 70 corresponds to the spark plugs 44a,44d which corresponds to the first and fourth spark plugs, the fired cylinders associated with this signal number are 1 and 4. In actuality, because only one of those two cylinders is in the combustion portion of the cycle (the other being in the exhaust cycle) the cylinder in which ignition actually occurs is either cylinder 1 or cylinder 4.

The next signal received by the ignition order counter portion 116 is from the second pulser coil 72. When this signal is received, it is given a value of 2. The cylinder which is imagined to have fired is cylinder 3 (i.e. the second of the cylinders to fire in the firing order), and the actually fired cylinders must be 2 and 3, because the two spark plugs corresponding thereto fire together. Because only one of the cylinders is in the combustion cycle at that time, either cylinder 2 or 3 actually ignites.

The next signal received by the ignition order counter portion 116 is from the first pulser coil 70. When this signal is received, it is given a value of 3. The imaginary cylinder firing corresponding to this value is 4, both cylinders 1 and 4 are actually fired, but combustion is only initiated in either cylinder 1 or 4.

The next signal received by the ignition order counter portion 116 is from the second pulser coil 70. When this signal is received, it is given a value of 4. The imaginary cylinder firing corresponding to this value is 2, the actually fired cylinders are 2 and 3, with combustion initiated in only cylinder 2 or 3. The data then repeats.

Figure 7:
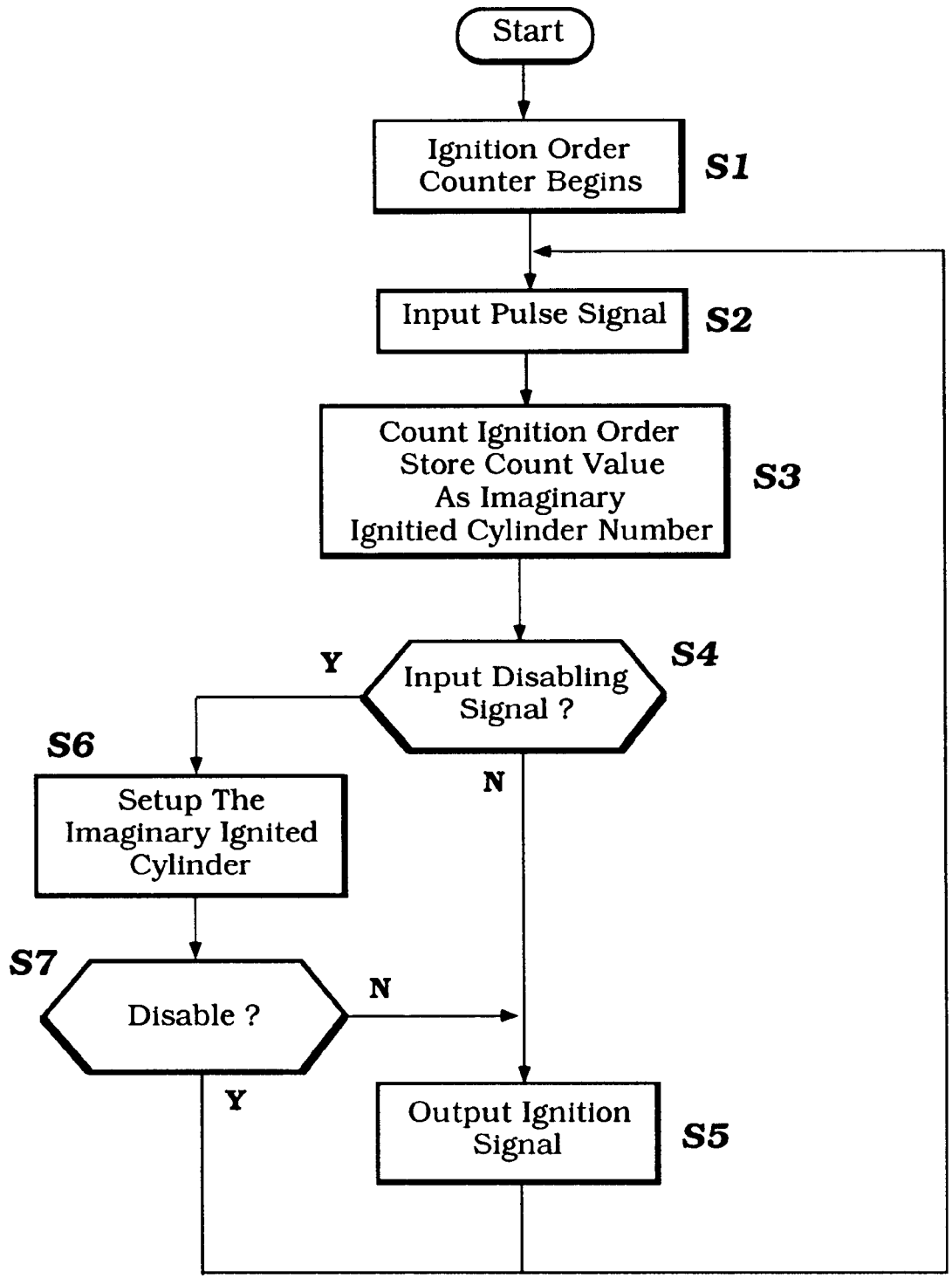
FIG. 7 is a flowchart illustrating an embodiment of a cylinder disabling function associated with the ignition control circuit of FIG. 5.

FIG. 7 is a flowchart illustrating a cylinder disabling function of the CPU 74 as accomplished with the cylinder disabling portion 114 and ignition order counter portion 116. Once the engine 40 is started, and in step S1, the ignition order counter portion 116 begins to function. In step S2, an input signal is received from one of the pulser coils 70,72. In step S3, the ignition order counter portion 116 assigns the signal an imaginary cylinder count number or value, as described above.

In step S4, the CPU 74 determines if a disabling signal (as described below) has been received. If not, an ignition signal is output from the ignition signal output portion 117 of the CPU 74 to the switching circuit 76 in step S5. If a disabling signal has been received, the cylinder disabling portion 114 of the CPU 74 is arranged to set up an imaginary disabled cylinder in step S6. In step S7, if the imaginary disabled cylinder matches the imaginary ignited cylinder, then no ignition signal is provided and the process repeats. In that event, the lack of an ignition signal prevents the firing of a cylinder which is otherwise in the combustion portion of the operating cycle. If the imaginary disabled cylinder does not match the imaginary ignited cylinder, then an ignition signal is output in step 5 and then the process repeats.

Figure 8:
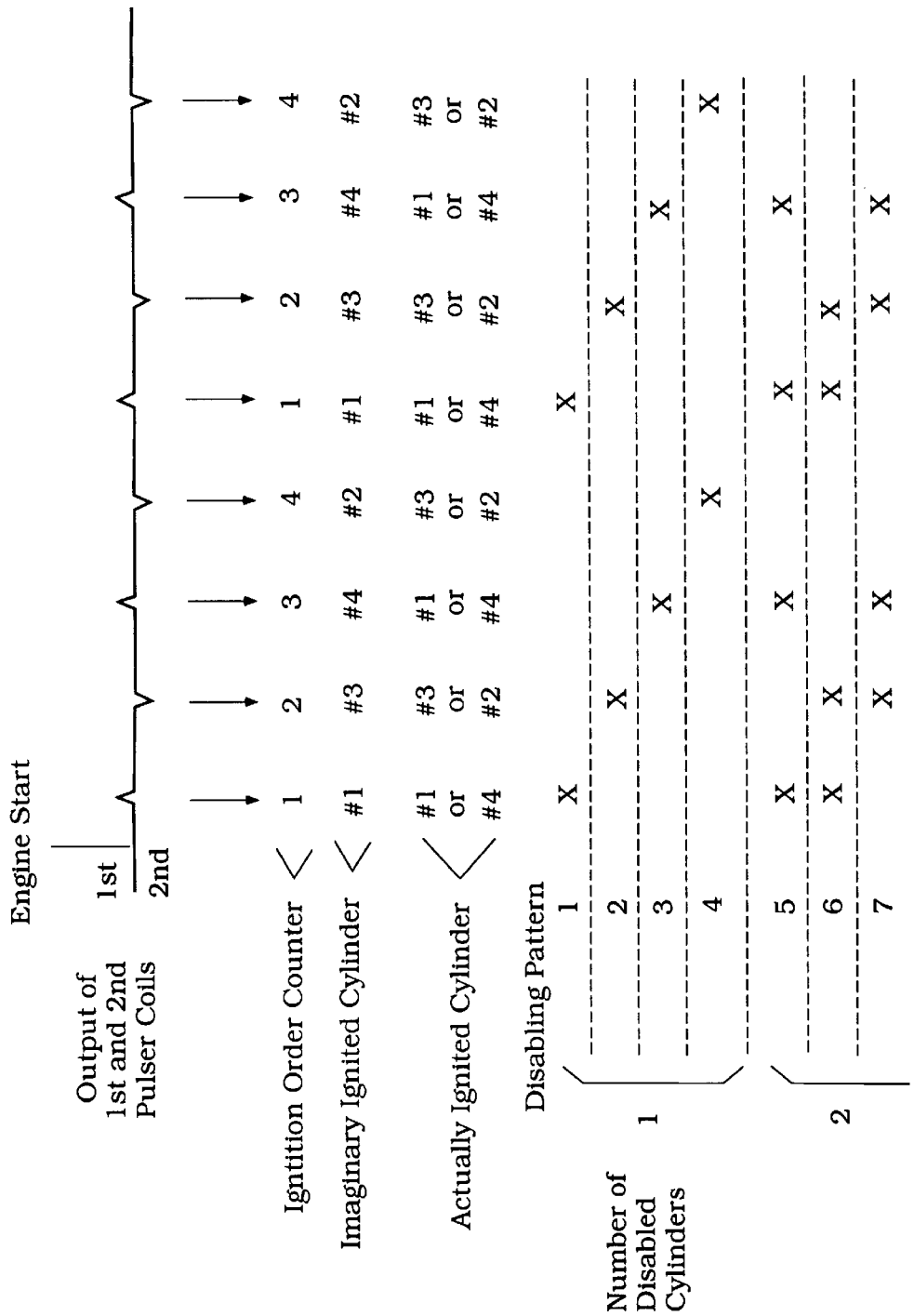
FIG. 8 is an exemplary table illustrating ignition order counter data, imaginary ignited cylinder data, actual ignited cylinder data, fired cylinder data, and exemplary disabling cylinder patterns associated with the disabling function of the ignition control circuit illustrated in FIG. 5, as compared to pulser coil output.

FIG. 8 illustrates an embodiment of a cylinder disabling arrangement employed by the CPU 74. The disabling cylinder portion 114 of the CPU 74 is arranged to employ one or more disabling patterns for disabling one cylinder of the engine 40. In a first pattern, the imaginary disabled cylinder is given a value of one and each time the imaginary ignited cylinder value is one, no firing signal is sent by the CPU 74 to the switching circuit 76, and the spark plugs 44a,44d corresponding to the first and fourth cylinders are not fired. This means that either the first or fourth cylinder, which would otherwise be set to fire, does not fire. On the other hand, when the imaginary ignited cylinder 4 is counted, a firing signal is provided, so that either one or the other of the first or fourth cylinders are actually fired each cycle. Of course, a firing signal is provided to both of the imaginary ignited cylinder values of 2 and 3. In this manner, three of the four cylinders are fired each cycle.

As illustrated by patterns 2–4, a similar arrangement may be employed with imaginary disabled cylinder values of 2, 3 or 4, whereby three of the four cylinders are fired.

The cylinder disabling portion 114 is also arranged to disable two of the four cylinders. With reference to pattern number 5, the imaginary disabling cylinder values are set as both 1 and 4, whereby the CPU 74 does not send a firing signal when the imaginary ignited cylinder values are 1 and 4. In this arrangement, both the first and fourth cylinders are prevented from firing, while cylinders 2 and 3 are both fired.

As illustrated, the CPU 74 may be arranged to prevent the firing of any pair of two cylinders in similar fashion. It is generally desirable to fire the cylinders in evenly spaced patterns to promote smooth running of the engine.

Though not illustrated, the cylinder disabling portion 114 includes one or more patterns for disabling three of the four cylinders in similar fashion to that described above. In addition, the cylinder disabling portion 114 includes a pattern for disabling all cylinders in which no firing signal is provided at any time.

Figure 9:
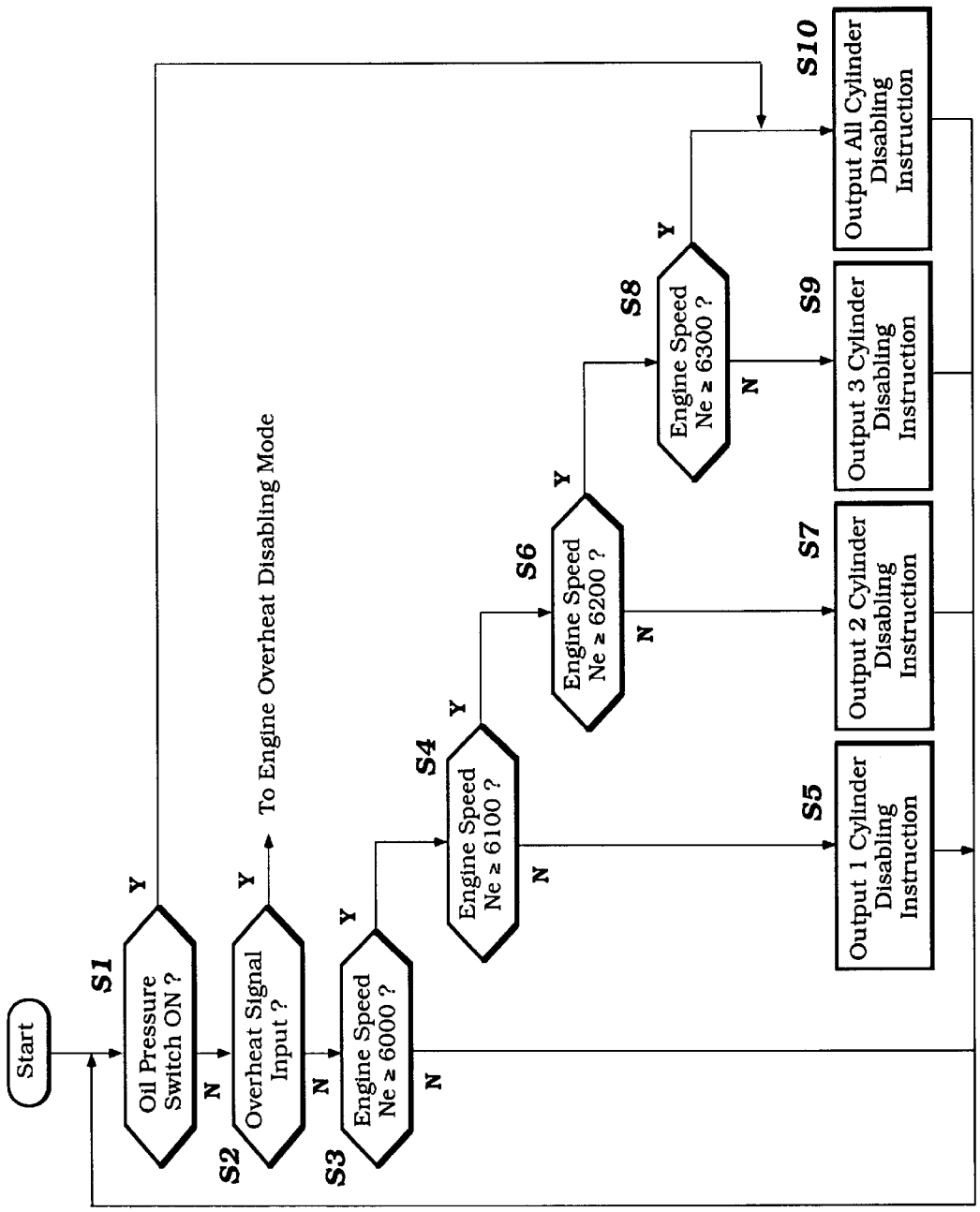
FIG. 9 is a flowchart illustrating an embodiment of an overrev, or engine speed reduction, function associated with the ignition control circuit illustrated in FIG. 5.

FIG. 9 illustrates an engine speed disabling or overrev protection function of the ignition control. As illustrated, in a first step, the CPU 74 determines if the oil pressure switch is on. If so (indicating a lack of oil pressure), then the cylinder disabling portion 116 of the CPU 74 is arranged to disable all of the cylinders in a step S10. When all of the cylinders are prevented from running, the engine 40 stops and the user may check the lubricating system.

If the oil pressure switch is not on, in another step, S2, the CPU 74 checks to determine if an engine overheat signal is received from the overheat detection portion 110. If so, an engine overheat disabling mode associated with an engine temperature control function, as described in more detail below, is instituted.

If not, in a further step S3, the CPU 74 checks the engine speed as calculated by the engine speed computation portion 112. If the engine speed is less than a predetermine high engine speed, such as, for instance, 6000 rpm, then the process repeats itself.

If the engine speed is equal to or greater than this high speed, then in another step, S4, the CPU 74 checks to see if the engine speed has become equal to or higher than a higher speed, such as 6100 rpm. If not (i.e. the engine speed is between 6000 and 6100 rpm), then in a step, S5, the CPU 74 is arranged to disable one cylinder and the process repeats. This instruction is preferably input into the disabling function illustrated in FIG. 7 at step S4, wherein the cylinder disabling portion 114 employs one of the "one cylinder disabled" patterns described in conjunction with FIG. 8 to prevent the appropriate firing signal for disabling one cylinder.

If the engine speed is equal to or greater than this higher speed, then in a further step, S6, the CPU 74 checks to see if the engine speed has risen to or is above a next higher speed, such as 6200 rpm. If not, in a step, S7, the CPU 74 disables two cylinders. If so, then in a step, S8, the CPU 74 checks to determine if the engine speed is at or above a still higher speed, such as 6300 rpm. If not, then the CPU 74 disables three cylinders in a step, S9, and if so, then all cylinders are disabled in step, S10 and the engine is completely shut down.

Figure 10:
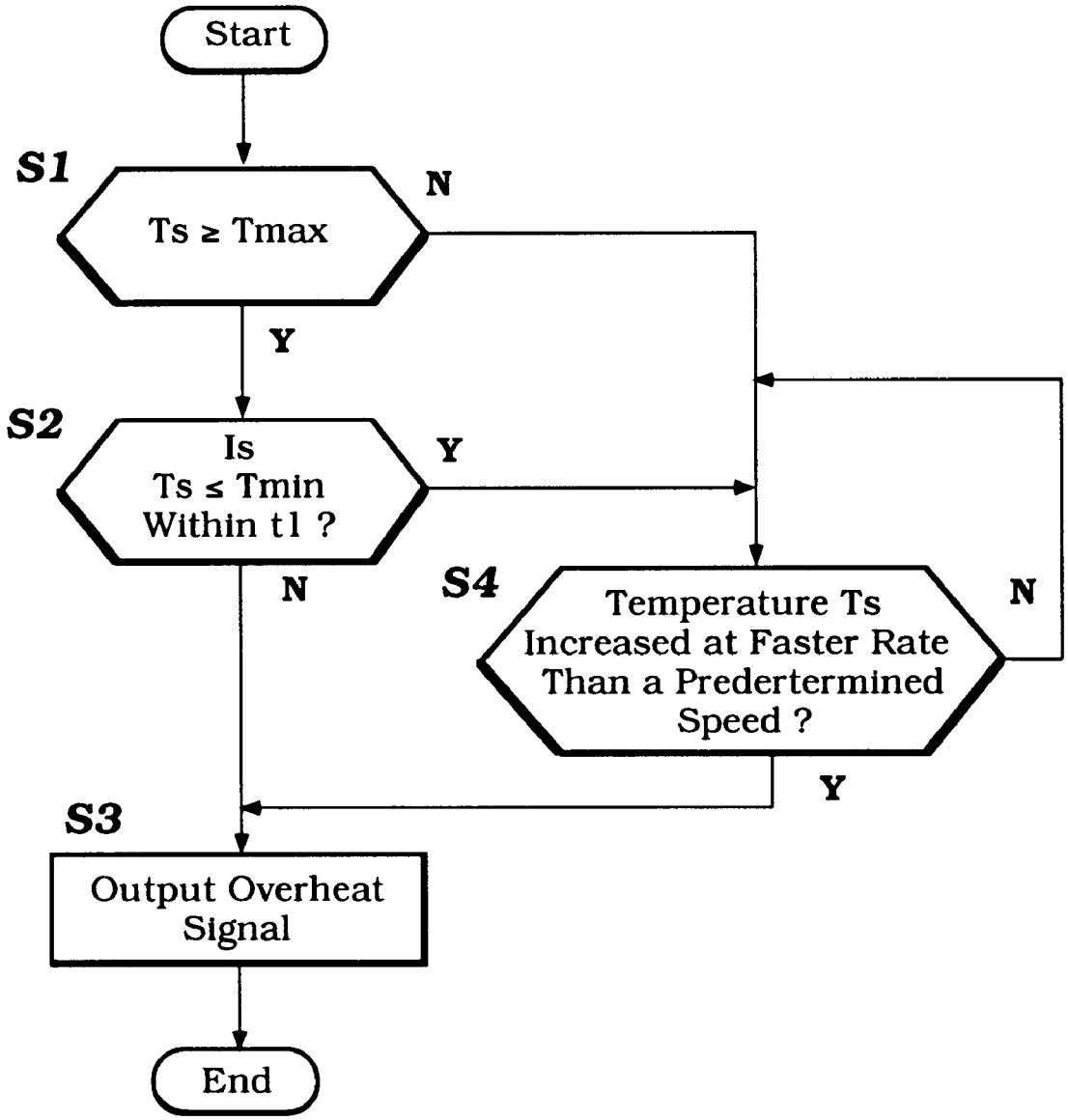
FIG. 10 is a flowchart illustrating an embodiment of an overheat detection system of the present invention that is associated with the ignition control circuit illustrated in FIG. 5.

FIGS. 10–13 illustrate various aspects of an embodiment of an engine overheat detection system of the present invention. This system includes the thermosensor 86 and the overheat detection portion 110 of the ignition control, as described above. As illustrated in FIG. 10, after the engine 40 is started, the CPU 74 is arranged to determine if a sampled engine temperature Ts is equal to or greater than a predetermined high temperature Tmax (step S1). This temperature, Ts, is received from the thermosensor 86. If so, then in a step S2, the CPU 74 checks to determine if the engine temperature Ts has fallen to a level equal to or below a predetermined low temperature Tmin within a predetermined time t1. If the temperature Ts has not fallen below Tmin, then in step S3, an engine overheat signal is output.

If the temperature Ts is less than Tmax in step S1, then in a step S4, it is determined whether the temperature Ts is increasing at a faster rate of speed than a predetermined rate of speed. If so, then the overheat signal is output in step S3. If not, then the CPU 74 rechecks the rate of increase in the temperature Ts.

If the temperature Ts is greater than Tmin in step S2, then the rate of increase in the temperature Ts is checked in step S4, as described above.

Figure 11:
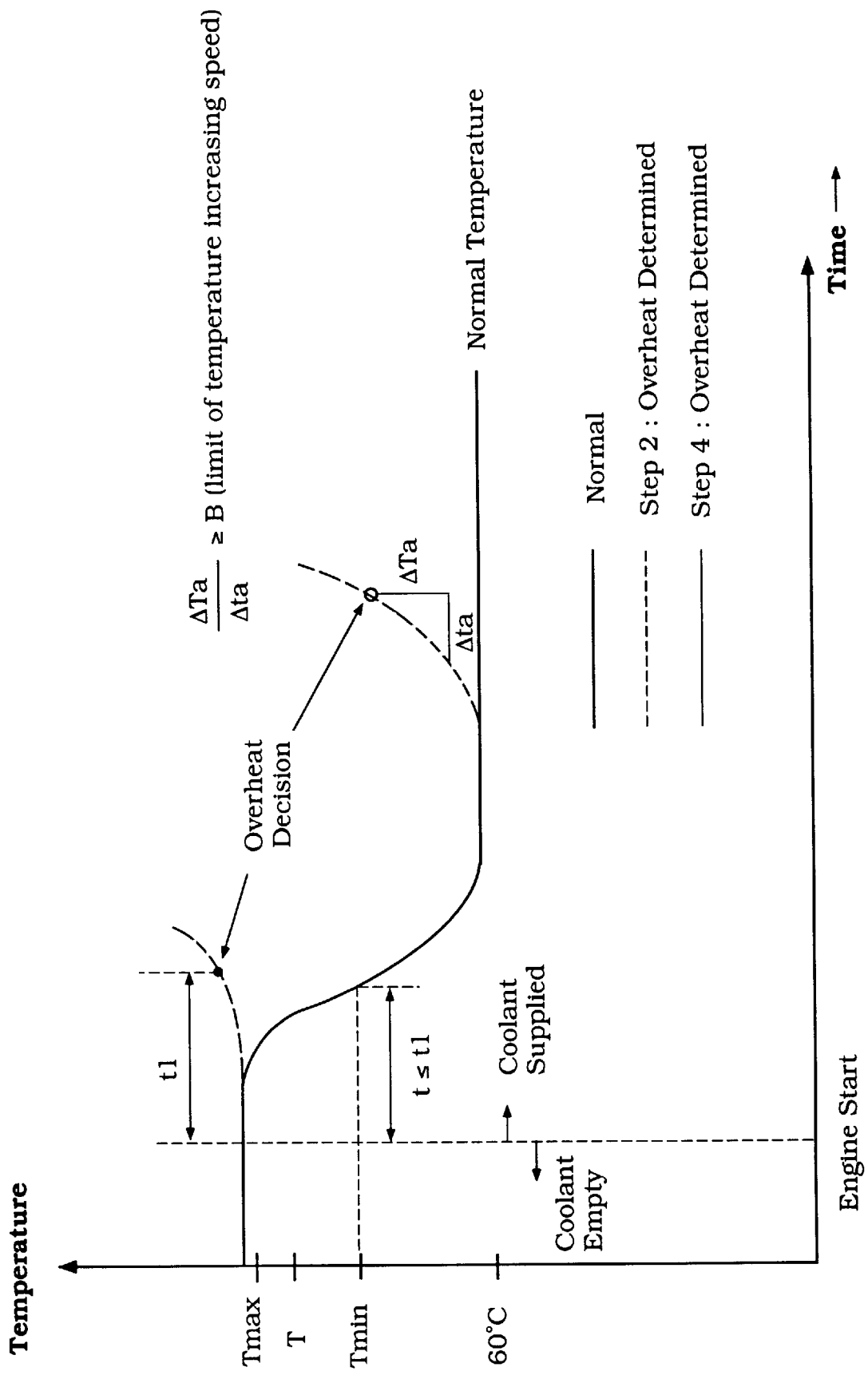
FIG. 11 is an exemplary graph illustrating temperature versus engine running time and illustrating certain aspects of the overheat detection system illustrated in FIG. 10.

FIG. 11 is a graph illustrating aspects of this overheat detection system. As illustrated, the engine 40 is preferably of the type having a coolant system in which when the engine is not running, there is no coolant flow in the water jackets. Coolant fills the water jackets and other passages some time after the engine 40 is started. Preferably, the time t1 is selected so that it is a long enough period to permit coolant to enter and cool the coolant jacket.

In this graph, the line for step S2 illustrates the condition when the temperature exceeds Tmax after a time t1 and an overheat condition is determined. Likewise, if the rate of increase in temperature as evident by line S4 exceeds a predetermined rate of increase $\beta=\Delta Ta/\Delta ta$, then an overheat condition is determined.

Figure 12:
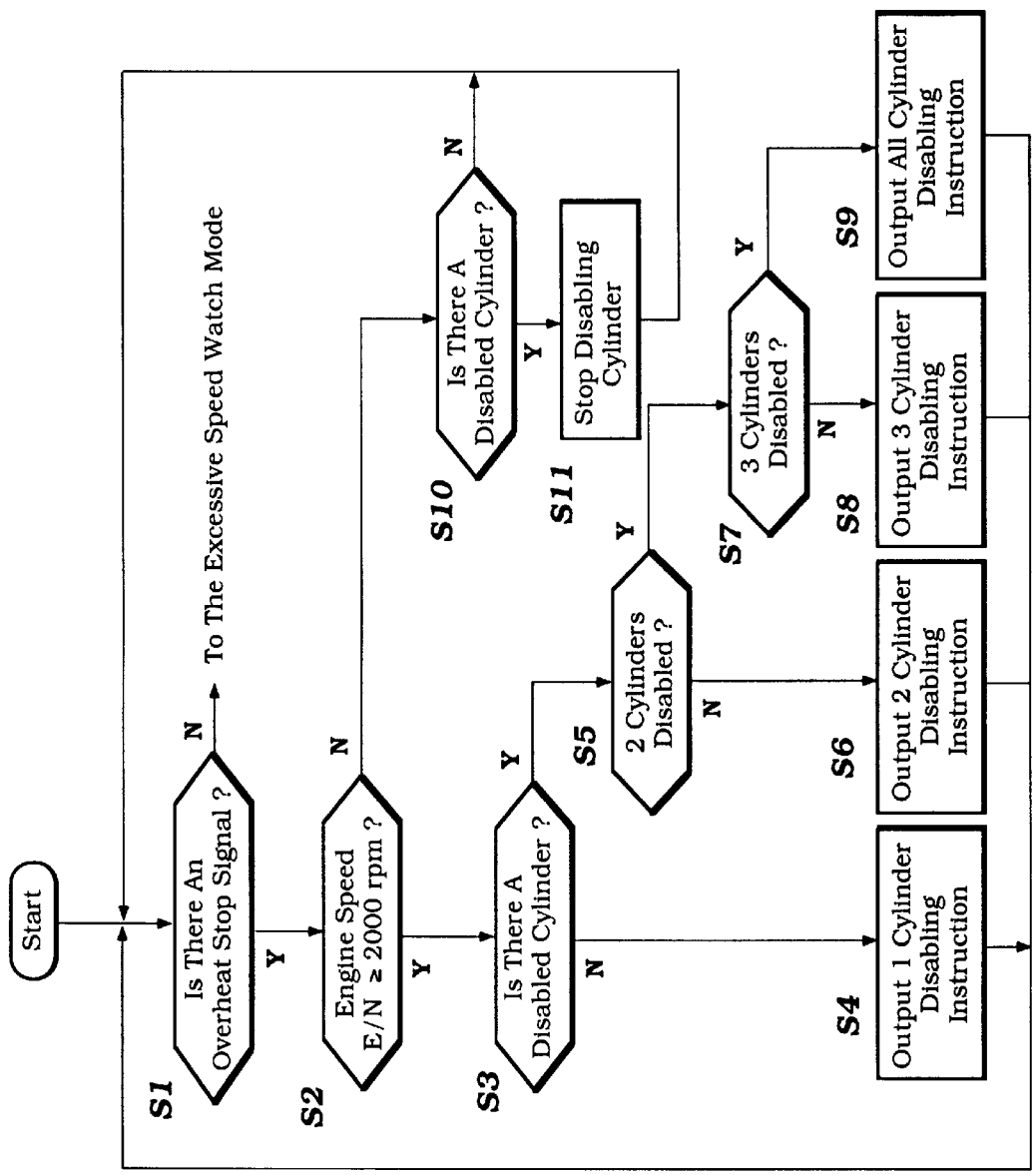
FIG. 12 is a flowchart illustrating an embodiment of a cylinder disabling prevention function associated with the overheat detection system illustrated in FIG. 10.

FIG. 12 is a flowchart illustrating an engine reduction function of the ignition control associated with the overheat detection mechanism. After the engine starts, in step S1, it is determined if there is an engine overheat detection signal. If not, then the CPU 74 is arranged to check for excessive engine speed (see flowchart illustrated in FIG. 9 and described above). If an engine overheat detection signal is received, then in a step S2, it is determined if the engine speed E/N is equal to or greater than a predetermined low speed, such as 2000 rpm. If not (i.e. the engine speed is less than 2000 rpm) then in a step S10, it is determined if there are any disabled cylinders. If not, the process returns to step S1, and if so, then these cylinders are not disabled to bring up the engine speed, and the process returns to step S1.

If the engine speed is equal to or greater than 2000 rpm, then in a step S3 it is determined if there are any cylinders disabled. If not, then in a step S4, an instruction to disable one cylinder of the engine is output (such as in step S4 of the flowchart illustrated in FIG. 7 and associated with the patterns illustrated in FIG. 7). The process then returns to the first step S1.

If there is already one disabled cylinder, then in step S5, it is determined if there are two cylinders disabled already. If not, then in step S6 an instruction to disable two cylinders is output and the process returns to step S1.

If so, then in step S7 it is determined if there are three cylinders disabled. If not, then in a step S8 an instruction to disable three cylinders is output and the process returns to step S1. If so, then in a step S9 an instruction to disable all cylinders is output.

Figure 13:
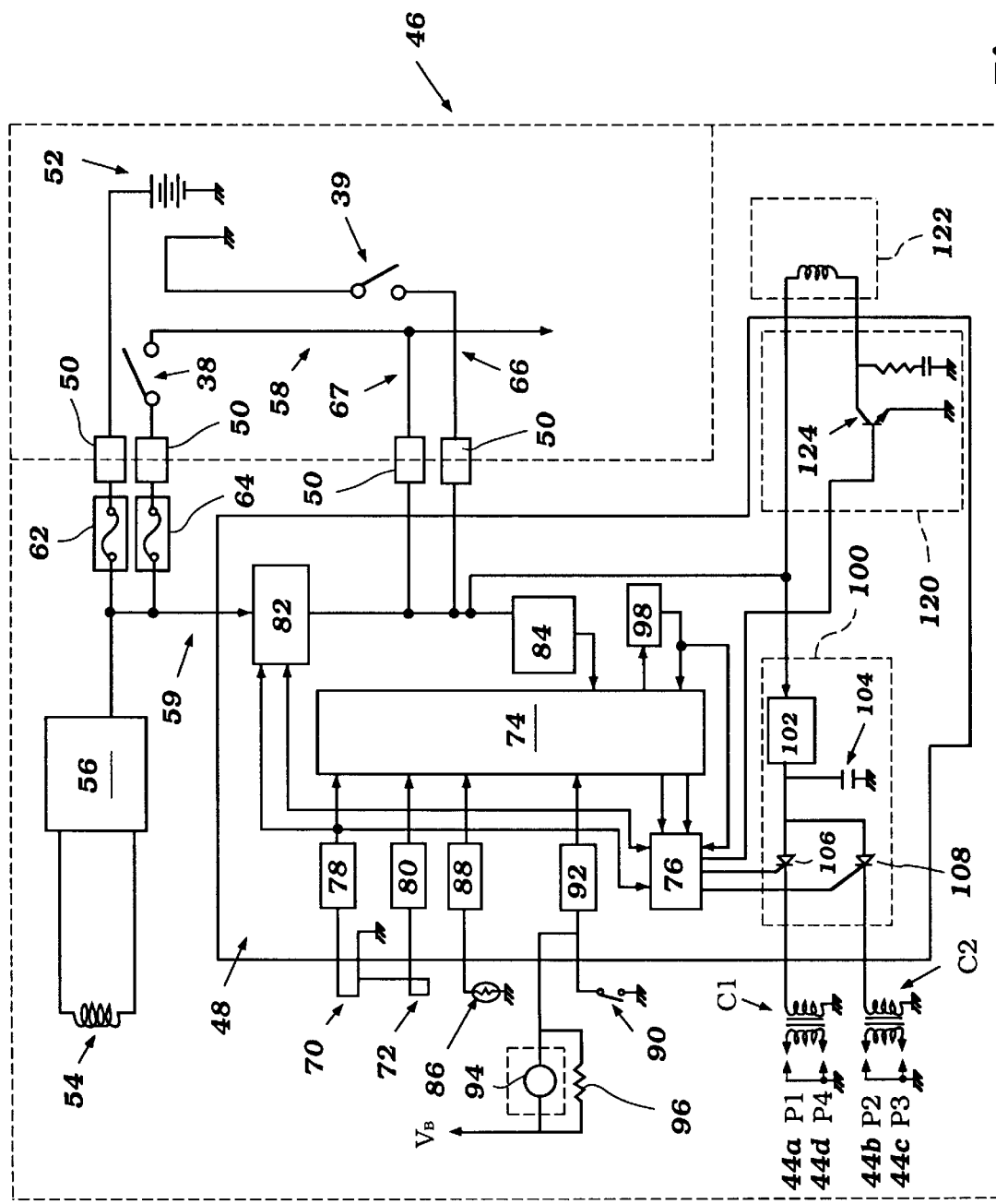
FIG. 13 is a circuit diagram of another embodiment of an electrical system having aspects, features and advantages in accordance with the present invention.

FIG. 13 illustrates an additional embodiment in which the switching circuit 76 controls both the ignition control circuit 100 and a fuel injector drive circuit 120. Comparing FIG. 13 to FIG. 3, it can be seen that the only significant difference between the illustrated embodiments is the addition of the fuel injector drive circuit 120. The illustrated embodiment of FIG. 13 utilizes a single fuel injector 122.; however, one of skill in the art will appreciate that the illustrated fuel injector drive circuit 120 can be modified for use with a plurality of fuel injectors as in a multipoint system, for instance.

As also known by those of skill in the art, an injector is basically an electrically operated valve manufactured to a very high precision which comprises a body and needle attached to a magnetic core. When a winding in the injector housing is energized, such as by current flowing through the winding, the core or armature is attracted to the winding and the valve opens, compressing a return spring. The fuel is delivered in a fine spray to wait behind a closed inlet valve until the induction stroke begins. Provided that the pressure across the injector remains constant, the quantity of fuel released is related to the open period, which in turn is determined by the time the electromagnetic circuit is energized. Thus, the control of current through the fuel injector drive circuit 120 can control the supply of fuel to any cylinder as desired.

As shown in FIG. 13, in the illustrated embodiment, the CPU 74, through the switching circuit 76, utilizes the information provided by the various sensors discussed above (i.e., the engine speed, the engine load, the engine temperature, etc.) to control both the timing and the open period of the fuel injector 122 and the ignition timing of the spark plugs 44a–44d. Specifically, current flow is controlled through a transistor 124.

When the CPU 74 determines that the appropriate time for an injection of fuel into the air stream has arrived, the CPU 74 alters the voltage at the base of the transistor, thereby allowing a flow of current through the winding of the fuel injector (i.e., because current flows through the collector to the emitter). The flow of current through the fuel injector winding allows a flow of fuel through the fuel injector as described above. When the CPU 74 determines the fuel flow should cease, the voltage at the base of the transistor is reduced through use of the switching circuit 76 to discontinue the flow of current through the transistor and, consequently, the fuel injector winding. Specifically, the current through the coil of the fuel injector 122 will decay in accordance with the values selected for the illustrated resistor and capacitor. The return spring closes the valve of the fuel injector when the electromagnetic force is removed and the flow of fuel is stopped. Thus, the CPU 74, in conjunction with the switching circuit 76, can control the timing and duration of fuel injection into the air stream. Similarly, in a multipoint embodiment, the timing and duration of fuel injection into specific cylinders is controllable.

Through the implementation of the present invention, described above in the context of presently preferred embodiments, an ignition control circuit can be provided with a source of constant voltage. In addition, because the auxiliary fuse 64 is no longer within the primary circuit which extends through the non-contact switch, the ignition system current is not restricted unnecessarily by the requirements of auxiliary electrical equipment, such as gauges and indicators. Further, because the main switch, which is mechanical, is not placed within the primary power circuit, any hull vibrations which may affect a mechanical switch are not able to interfere with the non-mechanical noncontact switch of the primary power circuit. Thus, one of the causes of engine-hunting can be removed through the use of the present invention.

The provision of a separable auxiliary power circuit from the primary circuit which is internal to the motor reduces the opportunity for corrosion or rust to affect the reliability of the feeder circuitry. Moreover, the provision of both a primary and an auxiliary power circuit creates a redundancy which can continue the operation of the engine in the event that one or the other circuit becomes interrupted.

Of course, the foregoing description is that of preferred embodiments of the invention, and various changes and modifications may be made without departing from the spirit and scope of the invention, as defined by the appended claims.

What is claimed is:

1. An electrical system for an engine comprising a charge circuit and an ignition circuit, a primary power circuit connecting the charge circuit and the ignition circuit, a non-contact switch being positioned along the primary power circuit such that the non-contact switch selectively connects the charge circuit to the ignition circuit after starting of the engine.

2. The electrical system of claim 1 further comprising at least one electrical equipment element wherein an auxiliary power circuit electrically couples the electrical equipment element to the charge circuit through a fused connection.

3. The electrical system of claim 2, wherein the auxiliary power circuit also is connected to the ignition circuit so as to provide power until the non-contact switch is closed.

4. The electrical system of claim 1 further comprising a means for detecting an operative engine condition wherein the means closes the non-contact switch after the engine is started.

5. The electrical system of claim 1, wherein the non-contact switch comprises a transistor.

6. The electrical system of claim 1, wherein the charge circuit comprises a coil and a rectifier, and wherein the rectifier rectifies electric power input which is generated by the coil and limits the output to a substantially constant voltage.

7. The electrical system of claim 1, wherein the ignition circuit comprises a charge condenser which raises the voltage above the substantially constant voltage level of the charge circuit.

8. The electrical system of claim 1 further comprising a fuel injector circuit which is in electrical communication with the ignition circuit.

9. The electrical system of claim 1, wherein the primary power circuit is completely contained within a housing surrounding the engine.

10. An electrical system for an engine comprising a power source, a direct power supply circuit and a fused power supply circuit, the power source emitting a substantially constant voltage, the direct power supply circuit directly connecting the power source and an ignition system, a non-contact switch being interposed along the direct power supply circuit between the power source and the ignition system, the fused power supply circuit electrically coupling the power source through a fuse to at least one electrical component and to the ignition system.

11. The electrical system of claim 10, wherein a level of current flow through the direct power supply circuit is higher than a second level of current flow through the fused power supply circuit.

12. The electrical system of claim 10, wherein the fuse controls the current flow amount through the fused power supply circuit to a level below the current flow amount through the direct power supply circuit.

13. The electrical system of claim 10, wherein the non-contact switch is closed during engine starting.

14. The electrical system of claim 10 further comprising a signal generator in electrical communication with the non-contact switch wherein the signal generator emits a signal to indicate the engine has started and the signal closes the non-contact switch.

15. The electrical system of claim 10 further comprising a mechanical switch interposed along the fused power supply circuit between the power source and the electrical component.

16. A watercraft comprising a hull and an external motor attached to the hull, the watercraft also having an electrical system, the electrical system having a first portion and a second portion, the first portion of the electrical system disposed within the hull and comprising a battery and an auxiliary circuit comprising a main switch and at least one electrical component, the second portion of the electrical circuit disposed within the motor and comprising a charging circuit, a primary circuit and an ignition control circuit wherein the charging circuit is connected by the primary circuit to the ignition control circuit with a non-mechanical switch arranged along the primary circuit.

17. The watercraft of claim 16, wherein the charging circuit of the second portion is connected through a fuse and an electrical connector to the auxiliary circuit of the first portion.

18. The watercraft of claim 17, wherein the main switch is arranged along the auxiliary circuit and interposed between the electrical connector and the electrical component.

19. The watercraft of claim 16 wherein the first portion is releasably coupled to the second portion to allow electrical communication between the first portion and the second portion.

* * * * *